(12) United States Patent
Krom et al.

(10) Patent No.: US 8,677,028 B2
(45) Date of Patent: Mar. 18, 2014

(54) INTERRUPT-BASED COMMAND PROCESSING

(75) Inventors: Mark Krom, Boulder, CO (US); Neal Countryman, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/861,590

(22) Filed: Aug. 23, 2010

(65) Prior Publication Data
US 2012/0047285 A1 Feb. 23, 2012

(51) Int. Cl.
*G06F 3/00* (2006.01)

(52) U.S. Cl.
USPC .............................. 710/5; 710/260

(58) Field of Classification Search
None
See application file for complete search history.

(56) References Cited

U.S. PATENT DOCUMENTS

| | | | |
|---|---|---|---|
| 5,818,539 A | 10/1998 | Naimpally et al. | |
| 5,828,416 A | 10/1998 | Ryan | |
| 6,085,277 A * | 7/2000 | Nordstrom et al. | 710/263 |
| 6,823,467 B1 | 11/2004 | Cantrill | |
| 7,130,932 B1 * | 10/2006 | Ghaffari | 710/22 |
| 7,525,549 B1 | 4/2009 | Diard et al. | |
| 8,380,909 B2 * | 2/2013 | Borchers et al. | 710/263 |
| 2002/0140962 A1 * | 10/2002 | Oka | 358/1.14 |
| 2002/0166018 A1 * | 11/2002 | Kim | 710/260 |
| 2006/0173970 A1 * | 8/2006 | Pope et al. | 709/216 |
| 2006/0212607 A1 * | 9/2006 | Riethmuller | 710/6 |
| 2008/0155571 A1 | 6/2008 | Kenan et al. | |
| 2008/0294832 A1 * | 11/2008 | Muppirala et al. | 710/316 |
| 2009/0199030 A1 | 8/2009 | Arimilli et al. | |
| 2011/0145474 A1 * | 6/2011 | Intrater | 711/103 |
| 2012/0047285 A1 * | 2/2012 | Krom et al. | 710/5 |

FOREIGN PATENT DOCUMENTS

FR 2923922 A1 5/2009

OTHER PUBLICATIONS

XILINX, DS677 Produce Specification, Ethernet AVB Endpoint v2.1, Jun. 24, 2009, p. 1-32, USA.
International Search Report and Written Opinion—PCT/US2011/048863—ISA/EPO—Dec. 22, 2011.

* cited by examiner

*Primary Examiner* — Elias Mamo
(74) *Attorney, Agent, or Firm* — James R. Gambale, Jr.

(57) ABSTRACT

In general, this disclosure describes techniques that allow communication between devices/modules of a computer system regarding inter-device/module command execution. In accordance with the techniques described herein, an operating device of a computing system may receive from a client one or more command indications of commands to be executed on the operating device. The operating device may further receive at least one command completion indicator that indicates a command for which one or more clients are awaiting completion of execution. The operating device may generate an interrupt that indicates completion of execution of the command for which the at least one command completion indicator was received. The interrupt may be a generic interrupt or a client-specific interrupt. In this manner, inefficiencies caused by client monitoring of operating device command execution may be reduced.

48 Claims, 14 Drawing Sheets

INTERRUPT-BASED COMMAND PROCESSING

TECHNICAL FIELD

This application relates to improved processing of commands between devices or modules of a computer system.

BACKGROUND

Typical computer systems employ a plurality of different devices, or modules within devices, that perform designated functions for data processing, memory storage, instruction processing, and the like. For example, a computer system may employ a Central Processing Unit (CPU) that executes program instructions and interfaces with other components of the system, for example random access memory (RAM), a hard drive, or solid state memories. Some computer systems employ more than one processor component for dedicated functionality, such as a Graphics Processing Unit (GPU) dedicated to the processing of graphics data and/or instructions. Other computer systems may employ a plurality of general purpose processor components.

In many cases, a client device may request execution of one or more commands from an operating device. For example, a CPU device or module may request execution of a series of commands (program) from a GPU device or module, because the GPU is specifically adapted for the processing of graphics commands. In another example, a CPU may request a series of commands to be executed to store data in one or more memory devices or modules. In yet another example, a memory device or controller module may request processing of data by a CPU or GPU device or module prior to the storing of data resulting from the process.

SUMMARY

In general, this disclosure describes techniques that allow communication between devices/modules of a computer system regarding inter-device/module command execution. An operating device may receive at least one command completion indicator that indicates a command for which one or more clients are awaiting completion of execution. The operating device may generate an interrupt that indicates completion of execution of a command for which the at least one command completion indicator was received. The interrupt may be a generic interrupt or a client-specific interrupt. In this manner, inefficiencies caused by client monitoring of operating device command execution may be reduced.

In one example, a method includes receiving, from one or more clients by an operating device, one or more command indications of commands to be executed by the operating device. The method further includes receiving, from the one or more clients by the operating device, at least one command completion indicator that indicates a command for which the one or more clients are awaiting completion of execution. The method further comprises generating an interrupt indicating completion of execution of the at least one command for which the at least one command completion indicator was received.

In another example, a device includes a device execution module operable to execute commands. The device further includes a command receipt module configured to receive from one or more clients one or more command indications of commands to be executed by the device execution module. The device further includes an interrupt control module configured to receive from the one or more clients at least one command completion indicator that indicates a command for which the one or more clients are awaiting completion of execution. The interrupt control module is configured to, upon completion of execution of a command for which a command completion indicator was received, generate an interrupt that indicates that a command for which a command completion indicator was received has completed execution.

In another example, a computer readable storage medium comprises instructions for causing a programmable processor to receive, from one or more clients, one or more command indications of commands to be executed by the programmable processor. The computer readable storage medium further comprises instructions for causing the programmable processor to receive, from the one or more clients, at least one command completion indicator that indicates at least one command for which at least one of the one or more clients is awaiting completion of execution. The computer readable storage medium further comprises instructions for causing the programmable processor to generate an interrupt that indicates completion of execution of at least one command for which a command completion indicator was received.

In another example, a device includes means for receiving, from one or more clients, one or more command indications of commands to be executed by the device. The device further includes means for receiving, from the one or more clients, at least one command completion indicator of at least one of the one or more commands for which the one or more clients are awaiting completion of execution. The device further includes means for generating an interrupt that indicates completion of execution of at least one command for which at least one command completion indicator was received.

The details of one or more examples are set forth in the accompanying drawings and the description below. Other features, objects, and advantages will be apparent from the description and drawings, and from the claims.

DETAILED DESCRIPTION

Many computing systems or devices are partitioned into a plurality of discrete components (e.g., devices or modules) that perform specific functions of the computing system. Different components of a computing system may be embodied in a single hardware device, or may be embodied in a plurality of distinct, specialized devices. For instance, different components of a computing system may be implemented as one or more microprocessors, application specific integrated circuits (ASICs), field programmable gate arrays (FPGAs), discrete logic, software, hardware, firmware, or any combinations thereof.

For example, a computing system may employ one or more processors and/or one or more storage (e.g., memory) components. A computing system may employ both general purpose processors and/or memory components (CPU, RAM memory, Hard-Drive Memory), and may further employ components adapted to specific tasks, for example a Graphics Processing Unit (GPU) or a cache memory for storing graphics data for processing. A GPU may be a specialized processor that enhances performance of media related workloads, such as video and audio coding/decoding, compression, graphics rendering, video and audio signal processing, and the like. In some examples, a GPU may be included within a wireless communication device (e.g., wireless mobile handset or device), a digital camera, digital television (TV), a video camera, a video telephone, a digital multimedia player, a personal digital assistant (PDA), a video game console, a personal computer or laptop device, a smartbook/smartphone, or other similar device.

In a typical computing system environment, the above-mentioned discrete components may be adapted to request execution of a task or function from other discrete components of the computing system. For example, a client device such as a CPU may request execution of commands relating to the processing of graphics related data or instructions from an operating device such as a GPU. In another example, a GPU (client) may request the processing of non-graphics data or instructions from a CPU (operating device). In other examples, a CPU or GPU (client device) may request the storage of data or instructions to a memory (operating device) such as a RAM memory for instructions to be executed, or a hard-drive memory for data to be stored. Likewise, a memory component (client device) or controller may request execution of instructions from a CPU or GPU (operating device) prior to the saving of data by the memory component.

Figure 1:
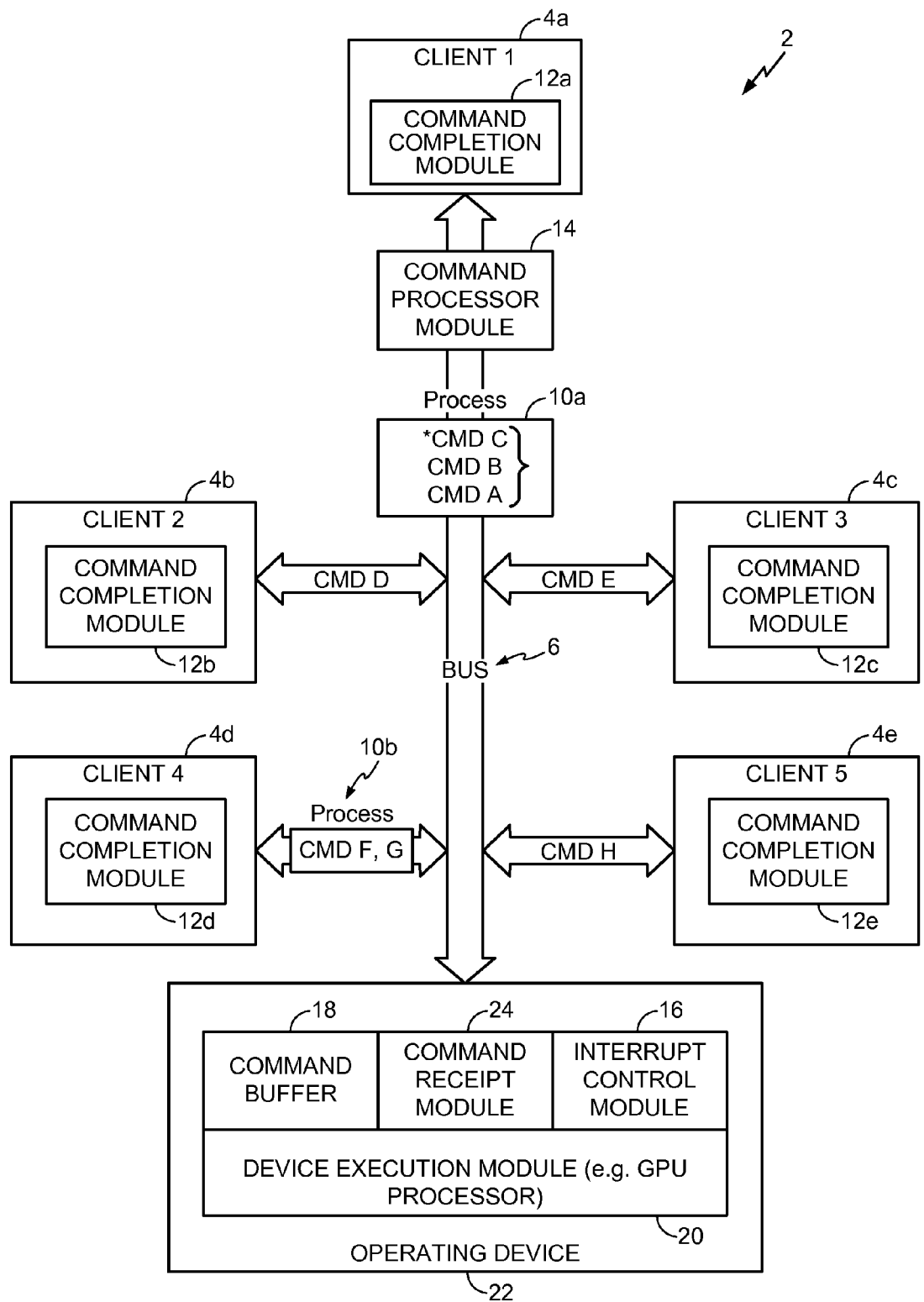
FIG. 1 is a block diagram illustrating an example computing system consistent with this disclosure.
Figure 2:
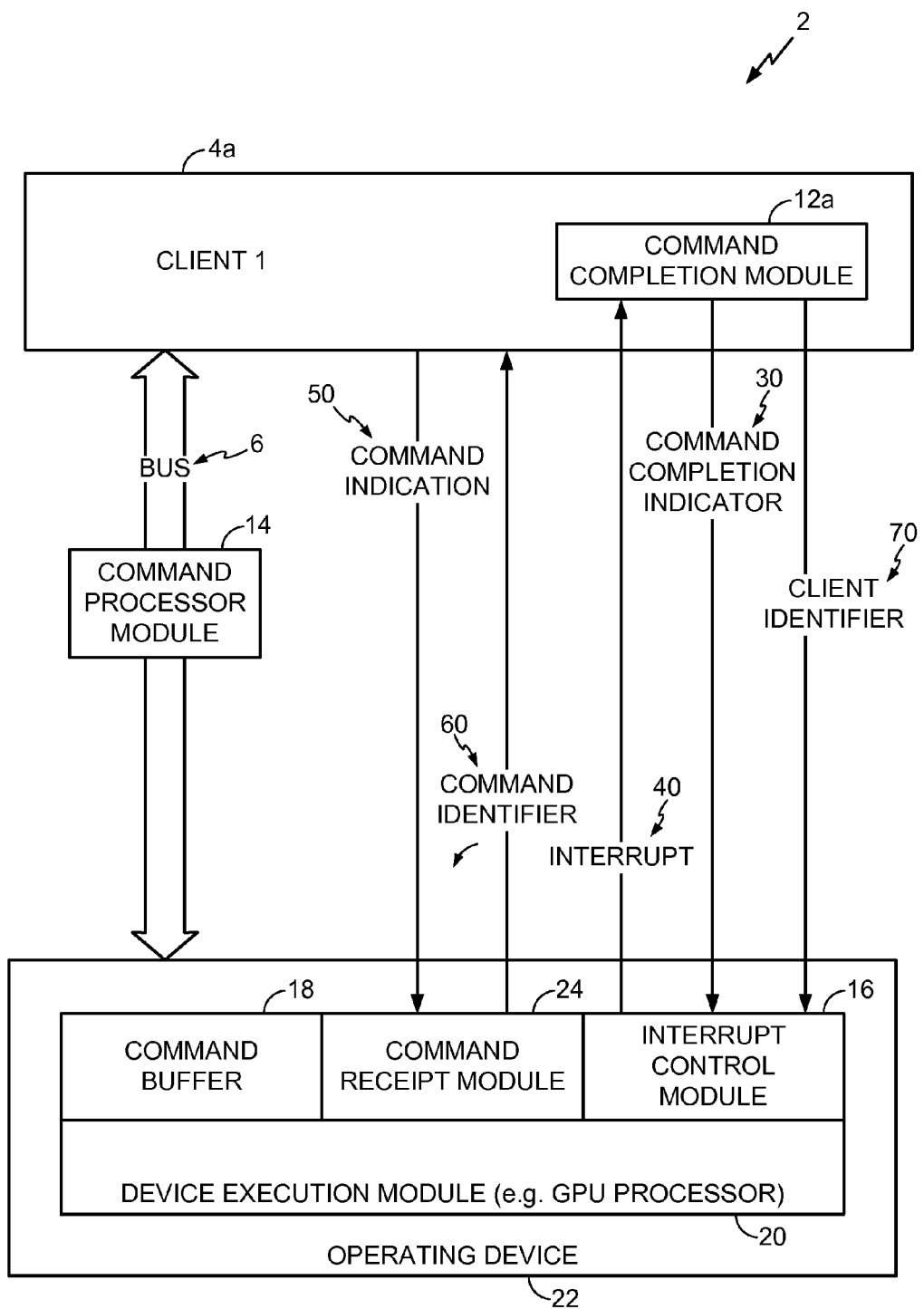
FIG. 2 is a block diagram illustrating an example computing system consistent with this disclosure.

FIG. 1 is a block diagram that illustrates components of an exemplary computing system 2, and command processing aspects of such a computing system consistent with the disclosure provided herein. As shown in FIG. 2, system 2 includes a plurality of discrete devices or modules, referred to herein as components of system 2. Components of system 2 may be individual and distinct hardware components such as dedicated processor or memory hardware. Multiple components of system 2 may instead share hardware components, for example where a CPU, GPU, and/or memory are embedded in a single chip, such as an Application Specific Integrated Circuit (ASIC) or Field Programmable Gate Array (FPGA).

System 2 includes a plurality of clients 4a-4e (collectively, clients 4) and at least one operating device 22. The plurality of clients 4a-4e may be coupled to operating device 22 via a system bus 6. Bus 6 is operable to enable communication between any of components 4 and 22, for example the communication of commands by one or more of clients 4a-4e to be executed by operating device 22.

As depicted in the example of FIG. 1, one or more of clients 4a-4e may request execution of one or more commands by operating device 22. In some cases, a plurality of clients 4a-4e may request command execution by operating device 22 at or around the same time. According to system 2 of FIG. 1, each of clients 4a-4e requests command execution by operating device 22. As shown, client 4a requests execution of commands A, B, and C, client 4b requests execution of command D, client 4c requests execution of command E, client 4d requests execution of commands F and G, and client 4e requests execution of command H.

As also shown in FIG. 1, clients 4a-4e may request execution of a single command (clients 4b, 4c, and 4e; commands D, E, and H, respectively), or may request execution of a plurality of commands (clients 4a and 4d, process 10a consisting of commands A-C and process 10b consisting of commands F and G, respectively) in the form of a process, e.g. a program or other set of command instructions. The examples of commands and processes 10a-b depicted in FIG. 1 are simplified for exemplary purposes. Typically, a client will send a process consisting of hundreds or thousands of commands to be executed by operating device 22. Often, a client may require that operating device 22 complete execution of a command or process (e.g. the last command of a process) prior to the client executing other commands or performing other functionality of system 2.

System 2 includes command processor module 14. Command processor module 14 may operate as a funnel to transfer commands from one or more of clients 4 to one or more operating devices 22. Command processor module 14 may be adapted to receive one or more commands from clients, order commands, assign commands to one or more operating devices 22, and transmit one or more indications of commands to operating device 22. Command processor module 14 may order commands based on when commands were received, and transmit indications of commands to operating device 22 in the order received. Command processor module 14 may not order commands of a particular process (e.g. processes 10a or 10b of FIG. 1) sequentially. For example, command processor module 14 may interleave commands of a process 10a along with other commands received from clients other than a client that requested execution of a process.

As discussed above, command processor module 14 may transmit one or more command indications of commands to one or more operating devices 22. In one example, the one or more command indications may be program instructions. In other examples, the one or more command indications may be data to be stored or processed. In still other examples, the one or more command indications may be a memory location or other indicator of a location where program instructions or data may be found and retrieved by one or more operating devices 22.

Command processor module 14 may be embodied in a number of different ways. In one example, command processor module 14 may be embodied in any combination of software, firmware, or hardware that is part of one of client devices 4a-4e, such as a CPU client. In other examples, command processor module 14 may be embodied in any combination of dedicated software, firmware, or hardware that not part of one of client devices 4a-4e, for example a dedicated microprocessor.

System 2 further includes command buffer 18. Command buffer 18 may be a hardware register, memory device or a block of memory of a memory device. Command buffer 18 may include an input command buffer. The input command buffer may be a hardware register, memory device, or memory block adapted store commands received from clients 4a-4e via command processor module 14 for execution by device execution module 20 of operating device 22. Command buffer 18 may further include an output command buffer. An output command buffer may be a hardware register, memory device, or memory block adapted to store indications of at least one command for which execution has completed on operating device 22.

System 2 further includes command receipt module 24. Command receipt module 24 may be generally adapted to receive commands from clients 4 and prepare them for execution by device execution module 20 of operating device 22. In one example, command receipt module 24 may place received command indicators in an input buffer of command buffer 18 for subsequent execution. For example, a client, e.g. one of clients 4a-4e, sends a command indication requesting a command to be executed on operating device 22. Command indications may be received by command processor module 14, ordered, and sent to operating device 22. Command receipt module 24 may receive a command indication of a command to be executed. Command receipt module 24 may assign a unique command identifier to a received command. In one example, the command identifier may be a binary number. The binary number may be a sequentially generated binary number that increments each time a command identifier is received by command receipt module 25. Command receipt module 24 may place an indication of a command, e.g. a command identifier, in an input buffer of command buffer 18. Command receipt module 24 may return to the client that requested execution of the command the command identifier. In one example, the command identifier is returned to command processor module 14, and is redirected to a requesting client. In other examples, the command identifier is returned directly to a requesting client.

The command identifier returned to a client may serve a plurality of purposes. In one example, the command identifier may serve as a return acknowledgement that a command issued by a client has been received by operating device 22 and is ready for execution. As another example, the command identifier may allow the client to monitor execution of a command to determine whether or not the command has completed execution. Because a command identifier may be sequentially generated and assigned as command indications are received by command receipt module 24, a command identifier may further indicate an order of execution of commands.

As previously mentioned, in many cases a particular client may wait for completion of execution of one or more commands to be executed by an operating device 22 before continuing to execute one or more functions of system 2. In one example, a client may wait for the last command of a process (e.g. command C of process 10a illustrated in FIG. 1) to complete execution. According to typical computing systems, in order to determine whether a command has completed execution, a client may monitor command buffer 18 to determine whether a particular command for which the client is waiting has completed. To do so, a client may intermittently "ping", or review the contents of, the output command buffer of command buffer 18 to determine whether the output command buffer includes a command identifier that indicates that operating device 22 has completed execution of a desired command.

The need for a client to "ping" an operating device 22 command buffer 18 may be undesirable for a number of reasons. In general, the need to "ping" a command buffer 18 may cause an undesirable drain on client 4 resources, such as CPU cycles of a client 4 that is a processor. If the client "pings" too often, then the client's computing resources may be unduly stressed, and consume precious CPU cycles that could be utilized for other purposes, such as for execution of internally executed commands or functions of the client. If the client "pings" command buffer 18 too infrequently, then the client may have to wait unduly for a period of time after a command executed on operating device 22 has actually completed execution before the client is aware that execution has completed, thus delaying internal execution of other programs or functions by client. As such, there may be a need for improvements with respect to inter-device/module command execution in a computing system.

In response to the above-mentioned deficiencies in computing system command execution, systems, methods, and devices providing for improved communication regarding inter-device/module commands are disclosed herein. Referring again to FIG. 1, one or more clients (e.g. clients 4a-4e) are provided with a command completion module (command completion modules 12a-12e in FIG. 1), and one or more operating devices 22 are provided with interrupt control module 16. In various examples discussed below, command completion module 12 and interrupt control module 16 interface with each other and other systems, modules, and devices of system 2 to improve communication with respect to inter-device/module command execution.

FIG. 2 is a block diagram of a computing system 2 adapted to improve communications regarding inter-device/module command execution consistent with the disclosure provided herein. For purposes of explanation, system 2 of FIG. 2 is shown with only a single client 4a, and a single operating device 22, however one of skill in the relevant art will recognize that the system 2 is applicable to any number of clients or operating devices.

As shown in FIG. 2, client 4a is coupled to operating device 22 via a bus 6. Client 4a may desire execution of one or more commands on operating device 22. Client 4a may wait for completion of the one or more commands before continuing execution of other commands or functions of system 2. As discussed above with respect to FIG. 1, client 4a may, via command processor module 14, communicate a command indication 50 of a command (e.g., one or more of the commands shown in FIG. 1) to operating device 22. The command indication 50 may indicate a request to execute a command on operating device 22. Command receipt module 24 may be operable to return a command identifier 60 to client 4a.

Client 4a includes at least one command completion module 12a. Generally speaking, command completion module 12a functions to manage communications relating to inter-device/module command execution from the perspective of client 4a. Accordingly, command completion module 12a may transmit at least one command completion indicator 30 that indicates one or more commands for which client 4a is awaiting completion of execution.

As also shown, operating device 22 includes at least one interrupt control module 16. Generally speaking, interrupt control module 16 functions to manage communications relating to inter-device/module command execution from the perspective of operating device 22. In various examples as will be discussed in further detail below, interrupt control module 16 is adapted to, based on command completion indicator 30, transmit at least one interrupt 40 that indicates to one or more clients that one or more commands for which a command completion indicator 30 has been received have completed execution.

In some examples, the interrupt 40 is a generic interrupt transmitted to all or most devices and/or modules of system 2. In other examples, interrupt 40 is a client-specific interrupt transmitted to one or more specific clients that provided a command completion indicator 30. Also in various examples as will be discussed in greater detail below, interrupt control module 16 may be operable to perform one or more comparisons to determine whether an interrupt 40 should be generated. In one example, interrupt control module 16 is configured to compare a command identified by a command completion indicator 30 to commands as they complete execution on operating device 22. If a match is found to exist, an interrupt 40 may be generated. In one example of a generic interrupt configuration of system 2, command completion module 12a is configured to, at some point in time later than a command indication 50 for a command was sent to operating device 22, communicate at least one command completion indicator 30 that indicates that client 4a is awaiting completion of execution of the command. Interrupt control module 16 is configured to receive the command completion indicator 30, and store the command completion indicator 30 (e.g., in a memory or register) for comparison. The memory or register may or may not be part of command buffer 18. As discussed above, the command completion indicator 30 may be a command identifier 60. Interrupt control module 16 may store a single command completion indicator 30, or multiple command completion indicators 30 for comparison. As commands executed by operating device 22 complete, the command identifiers 60 of completed commands are compared to the one or more command completion indicators 30.

In one example, comparison includes determining a match between a completed command and a command completion indicator 30. In another example, comparison includes determining an order of precedence of commands, e.g. comparison of command identifiers 60 to determine which is to be executed earlier.

If interrupt control module 16 determines a match between a completed command and command completion indicator 30, a generic interrupt 40 is generated that notifies all clients (e.g. clients 4a-4e of FIG. 1) that a command for which a command completion indicator 30 was received has completed execution. In one example, the generic interrupt 40 includes a command identifier 60, enabling each client to determine whether interrupt 40 is directed to a command completion indicator 30 sent by the client. In other examples, a command identifier 60 identifying the completed command that triggered interrupt 40 may be placed in an output buffer of command buffer 18. Accordingly, the one or more clients that received generic interrupt 40 may access and review the contents of an output buffer of command buffer 18 to determine whether interrupt 40 is directed to a command completion indicator 30 sent by the client.

In another example of a generic interrupt configuration of system 2, instead of command completion module 12a providing a command completion indicator 30 in a step subsequent to the transfer of command indication 50, command completion indicator 30 may be communicated to operating device 22 along with the transfer of command indication 50. In one example, where command indication 50 is binary number or word representing a command, one or more bits of the binary or number or word may be reserved as a flag for command completion indicator 30. Accordingly, the one or more bits may be set if a client is awaiting completion of execution of the command. Operating device 22, and correspondingly interrupt control module 16, may be configured to read the one or more bits when command receipt module 24 receives command indications 50, and store a command indication 50 for a command for which the one or more bits indicate that a command completion indicator 30 has been sent with respect to the command. The command indication 50 may then be compared to commands as they complete execution on operating device 22 as described above.

In an example of a client-specific interrupt configuration of system 2, command completion module 12a may be configured to, when communicating command completion indicator 30 subsequent to the initial transmission of command indication 50, communicate one or more client identifiers 70 that identify a client. According to this example, interrupt control module 16 may be adapted to store in one or more buffers, registers, or other memory locations, a client identifier 70 along with each command completion indicator 30. The one or more buffers, registers, or other memory locations may be part of command buffer 18. Correspondingly, interrupt control module 16 may be configured to, upon completion of commands for which a command completion indicator 30 was sent (and corresponding comparison as discussed above), communicate a client-specific interrupt 40 to a particular client that issued a particular command completion indicator 30. The client 4 may then, without a need to determine whether the interrupt 40 is directed to the client, access data or other information resulting from the completion of the command that triggered the client-specific interrupt 40.

In another example of a client-specific interrupt configuration of system 2, a client may be adapted to, when communicating command indication 50 to operating device 22, provide both command completion indicator 30 and client identifier 70. The command completion indicator 30 and client identifier 70 may be included in a binary number or word representing the command indication 50 as discussed above with respect to command completion indicator 30. Correspondingly, similar to the example discussed above, interrupt control module 16 may perform comparisons and provide a client-specific interrupt 40.

Figure 3A:
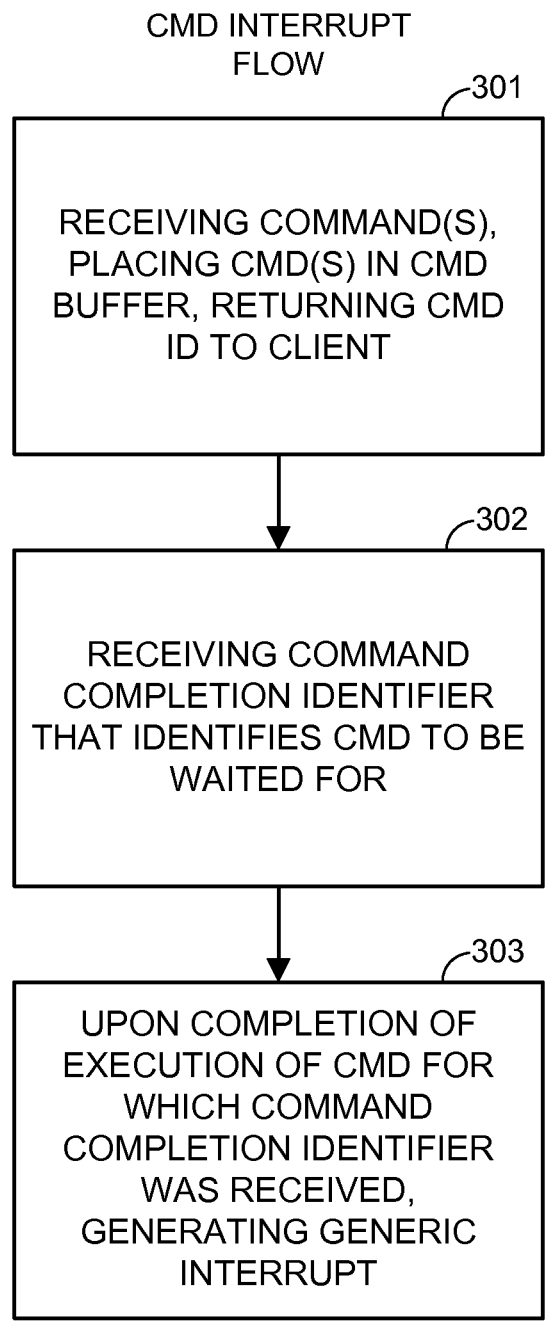
FIG. 3A is a flow chart illustrating one example of a method for communications regarding inter-device/module command execution from the perspective of an operating device consistent with this disclosure.

FIG. 3A is a flow chart diagram depicting one example a method for inter-device/module command execution communications consistent with the disclosure described herein. The method of FIG. 3A may be implemented according to a computing system such as computing system 2 depicted in FIGS. 1 and 2, however other computing systems are also contemplated. The example of FIG. 3A is from the perspective of an operating device, e.g., operating device 22 as discussed herein. As depicted, an operating device receives, from one or more clients, at least one command indication of one or more commands to be executed on the operating device (301). The one or more commands may be placed in an input command buffer. The operating device may return to a requesting client at least one command identifier that identifies the command.

The operating device may receive at least one command completion identifier that indicates one or more commands for which one or more client devices are awaiting completion of execution (302). The command completion identifier may include the at least one indication of command identification that identifies the one or more commands for which one or more client devices are awaiting completion of execution.

Based on comparison of the command completion identifier with completed commands, when execution completes for any command for which the operating device received a command completion indicator, a generic interrupt is generated by the operating device and communicated to the one or more clients (303). The generic interrupt may or may not include a command identifier for the command that triggered the generic interrupt.

Figure 3B:
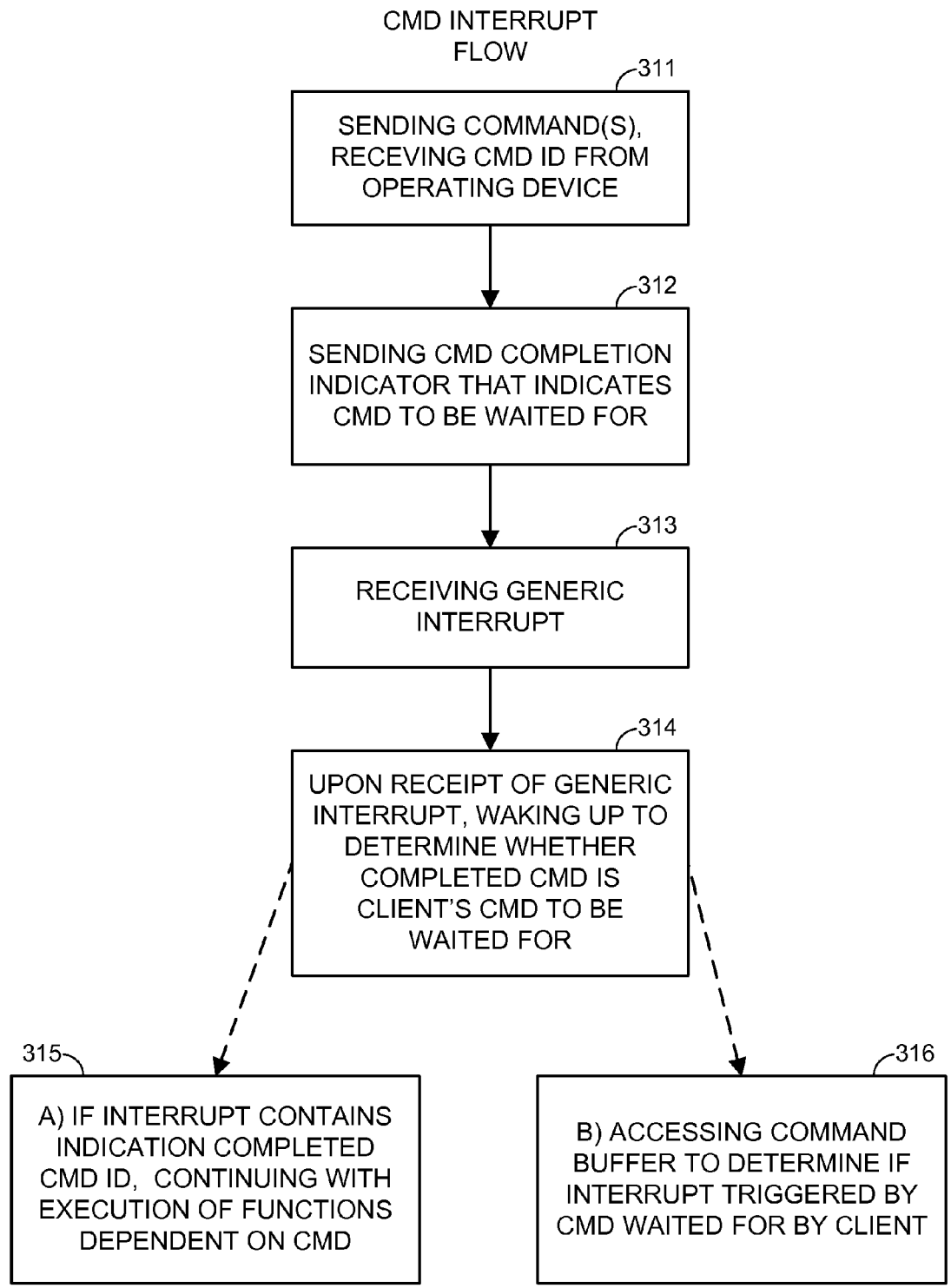
FIG. 3B is a flow chart illustrating one example of a method for communications regarding inter-device/module command execution from the perspective of a client consistent with this disclosure.

FIG. 3B is a flow chart diagram depicting one example a method for inter-device/module command execution communications consistent with the disclosure described herein. The method of FIG. 3B may be implemented according to a computing system such as computing system 2 depicted in FIGS. 1 and 2, however other computing systems are also contemplated. The example depicted in FIG. 3B is from the perspective of a client, e.g. client 4 as depicted in FIGS. 1 and 2. As depicted, a client sends at least one command indication of one or more commands 8 to be executed on an operating device (311). The client may receive from the operating device at least one command identifier that identifies a command received by the operating device.

The client sends at least one command completion indicator that indicates one or more commands for which the client is awaiting completion of execution (312). The at least one command completion indicator may include the at least one command identifier.

The client receives from the operating device at least one interrupt indicating that a command for which at least one of the one or more clients sent a command completion identifier has completed execution (313). The at least one interrupt may or may not include a command identifier that identifies the completed command that triggered the interrupt.

If the at least one interrupt includes a command identifier, the client may review the interrupt to determine whether the interrupt is directed to the client (314). If the interrupt is directed to the client, the client may retrieve the results of execution of the command and continue execution of functions dependant on completion of execution.

If the at least one interrupt does not include a command identifier, the client may access a buffer in which completed commands are stored to determine whether the interrupt indicated completion of execution of the one or more commands for which the client sent a command completion indicator (315). If the interrupt is directed to the client, the client may retrieve the results of execution of the command and continue execution of functions dependant on completion of execution of the command.

Figure 4A:
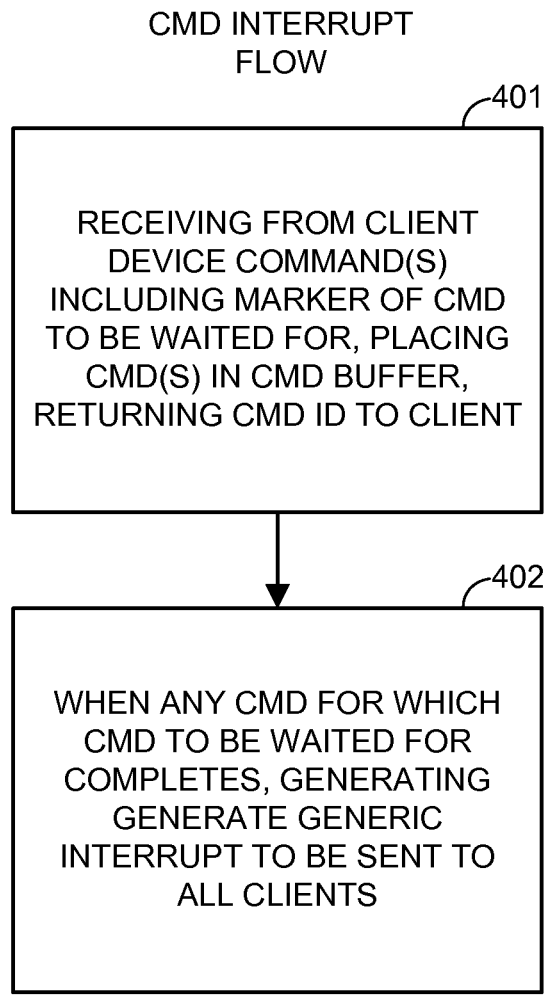
FIG. 4A is a flow chart illustrating one example of a method for communications regarding inter-device/module command execution from the perspective of an operating device consistent with this disclosure.

FIG. 4A is a flow chart diagram depicting one example a method for inter-device/module command execution consistent with the disclosure described herein. The method of FIG. 4A may be implemented according to a computing system such as computing system 2 depicted in FIGS. 1 and 2, however other computing systems are also contemplated. The example of FIG. 4A is from the perspective of an operating device e.g. operating device 22 as discussed herein. As depicted, an operating device receives, from one or more clients, at least one command indication of one or more commands to be executed on the operating device (401).

If a client is awaiting completion of execution of the command, the command indication may include a command completion identifier that indicates that the client is awaiting completion of execution of the command. In one example, the command completion identifier is one or more bits of the command indication. The one or more bits may be set to indicate whether or not a particular command is a command for which the client is awaiting execution. The operating device may be adapted to read the one or more bits and determine whether the client is awaiting completion of execution of the command.

Based on comparison of the command completion identifier with completed commands, when execution completes for any command for which the operating device received a command completion indicator, a generic interrupt is generated by the operating device and communicated to the one or more clients (402). The generic interrupt may or may not include a command identifier for the command that triggered the generic interrupt.

Figure 4B:
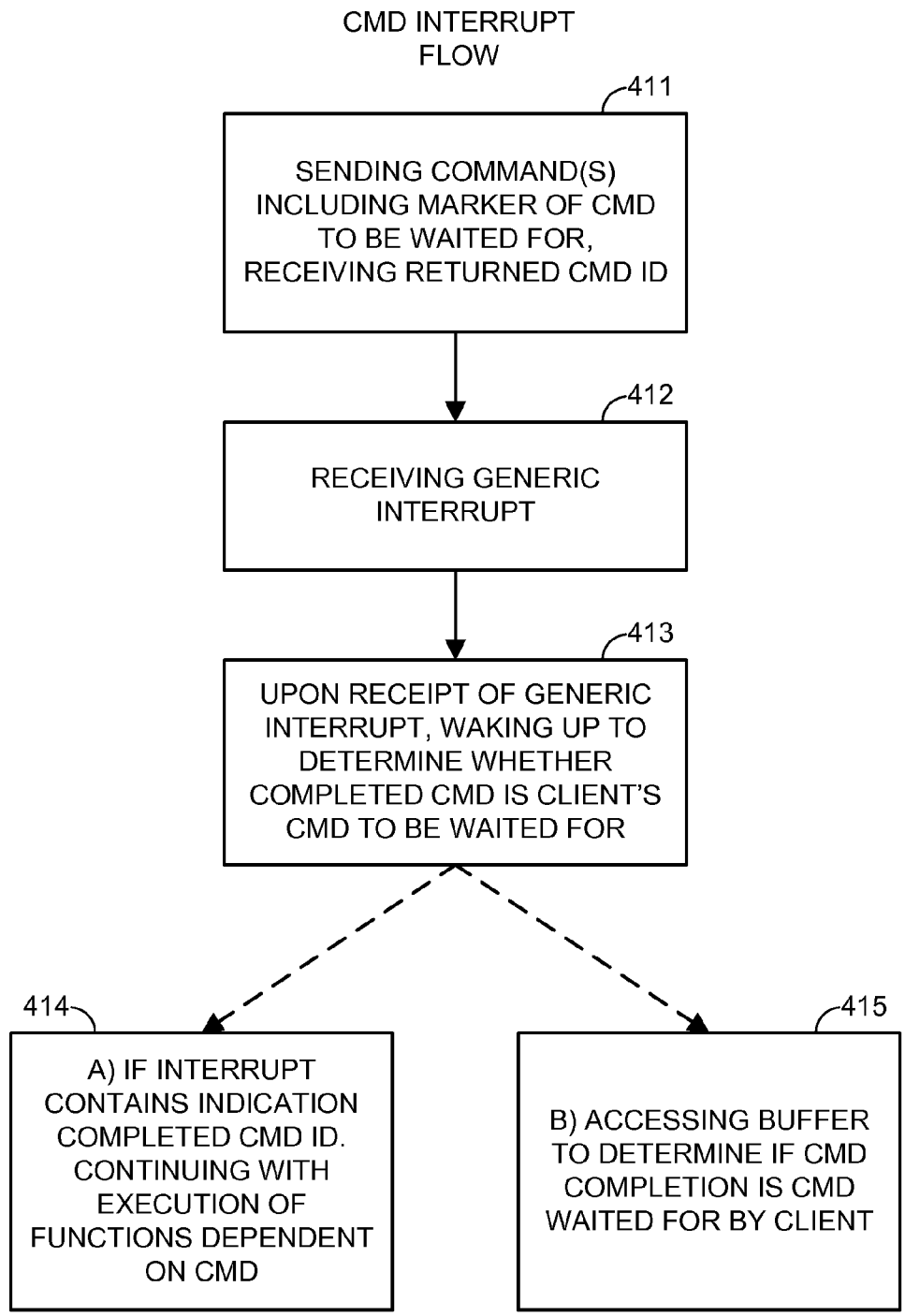
FIG. 4B is a flow chart illustrating one example of a method for communications regarding inter-device/module command execution from the perspective of a client consistent with this disclosure.

FIG. 4B is a flow chart diagram depicting one example a method for inter-device/module command execution communication consistent with the disclosure described herein. The method of FIG. 4B may be implemented according to a computing system such as computing system 2 depicted in FIGS. 1 and 2, however other computing systems are also contemplated. The example depicted in FIG. 4B is from the perspective of a client, e.g. client 4 as depicted in FIGS. 1 and 2. As depicted, a client sends at least one command indication of one or more commands 8 to be executed on an operating device (411). The command indication may include at least one command completion indicator that indicates that the client is awaiting completion of execution of the one or more commands. In one example, the command completion identifier is one or more bits of the command indication. The one or more bits may be set to indicate whether or not a particular command is a command for which the client is awaiting execution.

The client receives from the operating device at least one interrupt indicating that a command for which at least one of the one or more clients sent a command completion identifier has completed execution (412). The at least one interrupt may or may not include a command identifier that identifies the completed command that triggered the interrupt. Upon the receipt of the generic interrupt, the client may wake up to determine whether the completed command is a command for which the client is awaiting completion of execution (413).

If the at least one interrupt includes a command identifier, the client may review the interrupt to determine whether the interrupt is directed to a command for which a command completion identifier was included in a command indication sent by the client (513). If the interrupt is directed to the client, the client may retrieve the results of execution of the command and continue execution of functions dependant on completion of execution.

If the at least one interrupt does not include a command identifier, the client may access a buffer in which completed commands are stored to determine whether the interrupt indicated completion of execution of the one or more commands for which the client sent a command completion indicator (514). If the interrupt is directed to the client, the client may retrieve the results of execution of the command and continue execution of functions dependant on completion of execution of the command.

Figure 5A:
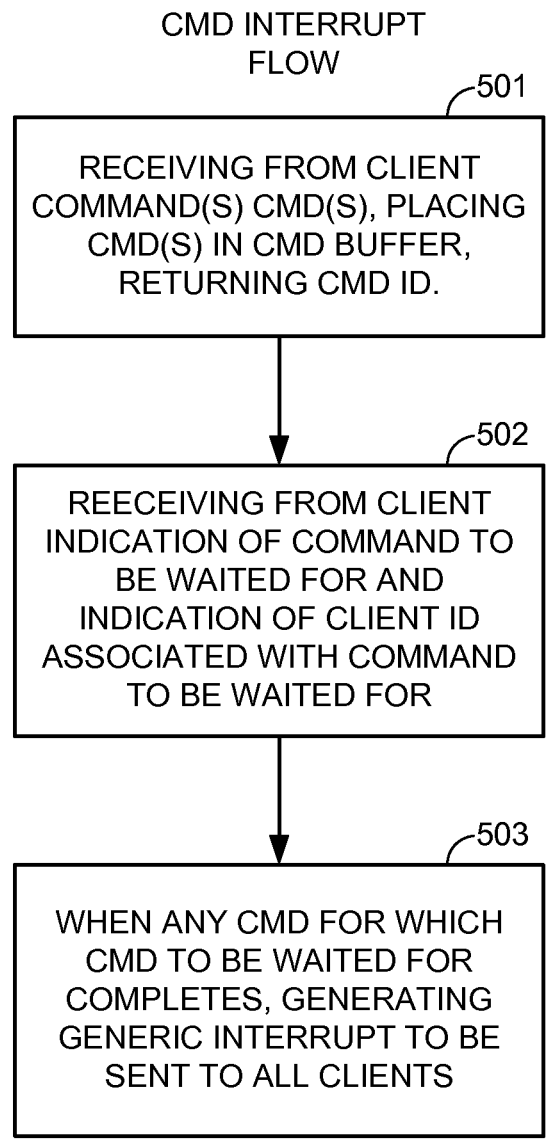
FIG. 5A is a flow chart illustrating one example of a method for communications regarding inter-device/module command execution from the perspective of an operating device consistent with this disclosure.

FIG. 5A is a flow chart diagram depicting one example a method for inter-device/module command execution consistent with the disclosure described herein. The method of FIG. 5A may be implemented according to a computing system such as computing system 2 depicted in FIGS. 1 and 2, however other computing systems are also contemplated. The example of FIG. 5A is from the perspective of an operating device e.g. operating device 22 as discussed herein. As depicted, an operating device receives, from one or more clients, at least one command indication of one or more commands to be executed on the operating device. The one or more commands may be placed in an input command buffer (501). The operating device may return to a requesting client at least one command identifier that identifies the command.

The operating device receives at least one command completion identifier that indicates one or more commands for which one or more client devices are awaiting completion of execution (502). The command completion identifier may include the at least one indication of command identification. In addition, the command completion identifier includes at least one client identifier that identifies the client that sent the command completion identifier.

Based on comparison of the command completion identifier with completed commands, when execution completes for a command for which the operating device received a command completion indicator, a client-specific interrupt is generated by the operating device and communicated to the one or more clients (503). The operating device may send the client-specific interrupt based on a received client identifier (e.g. at 502). The client-specific interrupt may or may not include a command identifier for the command that triggered the generic interrupt.

Figure 5B:
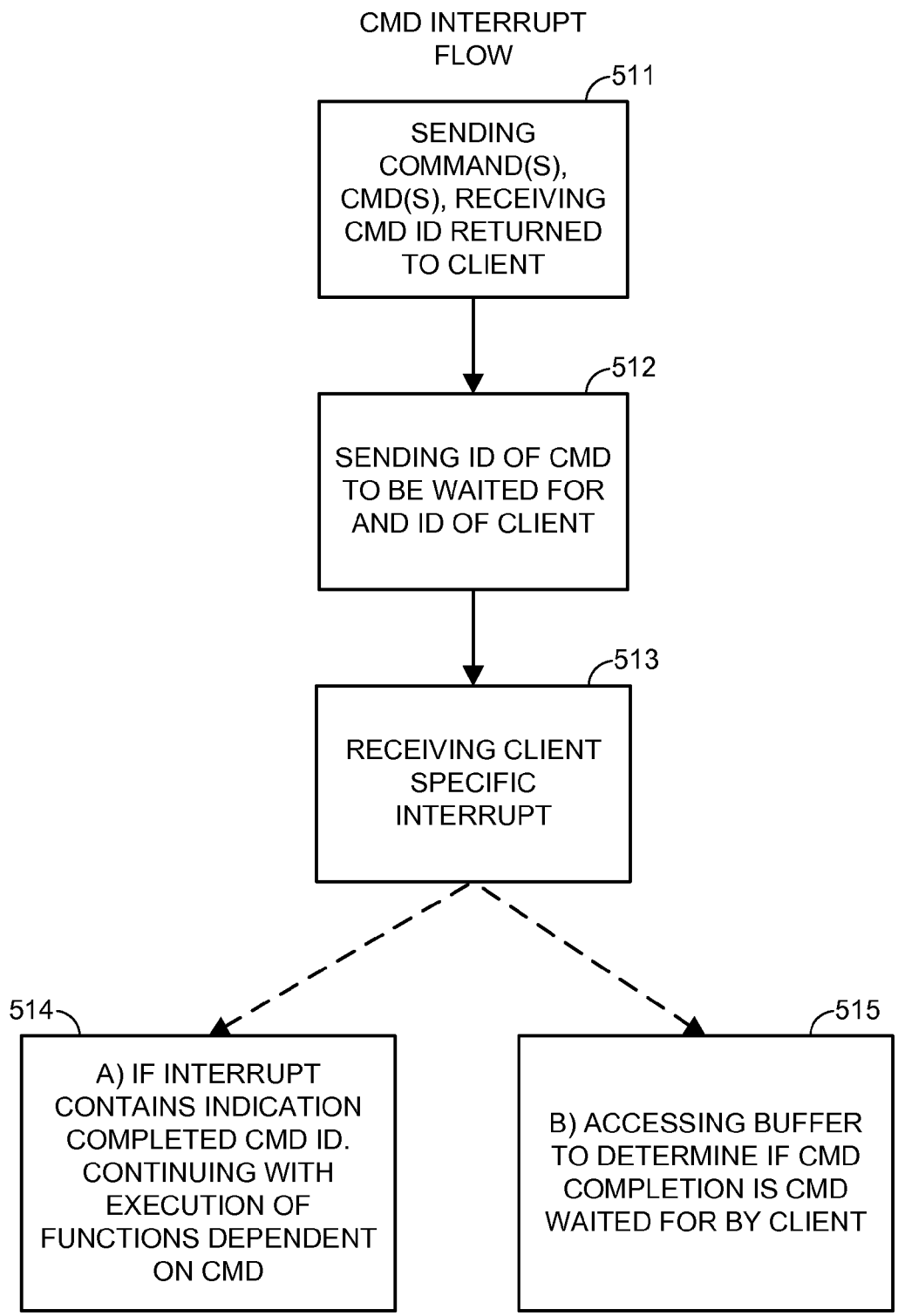
FIG. 5B is a flow chart illustrating one example of a method for communications regarding inter-device/module command execution from the perspective of a client consistent with this disclosure.

FIG. 5B is a flow chart diagram depicting one example a method for inter-device/module command execution consistent with the disclosure described herein. The method of FIG. 5B may be implemented according to a computing system such as computing system 2 depicted in FIGS. 1 and 2, however other computing systems are also contemplated. The example depicted in FIG. 5B is from the perspective of a client, e.g. client 4 as depicted in FIGS. 1 and 2. As depicted, a client sends at least one command indication of one or more commands to be executed on an operating device (511). The client may receive from the operating device at least one command identifier that identifies a command received by the operating device.

The client sends at least one command completion indicator that indicates one or more commands for which the client is awaiting completion of execution (512). The at least one command completion indicator may include the at least one command identifier. In addition, the command completion identifier includes at least one client identifier that identifies the client.

The client receives from the operating device at least one interrupt indicating that a command for which the client sent a command completion identifier has completed execution (513). The at least one interrupt may or may not include a command identifier that identifies the completed command that triggered the interrupt.

If the at least one interrupt includes a command identifier, the client may review the interrupt to determine the command that triggered the interrupt directed to the client (514). The client may retrieve the results of execution of the command and continue execution of functions dependant on completion of execution.

If the at least one interrupt does not include a command identifier, the client may access a buffer in which completed commands are stored to determine whether the command that triggered the interrupt was one for which the client sent a command completion indicator (515). The client may retrieve the results of execution of the command and continue execution of functions dependant on completion of execution of the command.

Figure 6A:
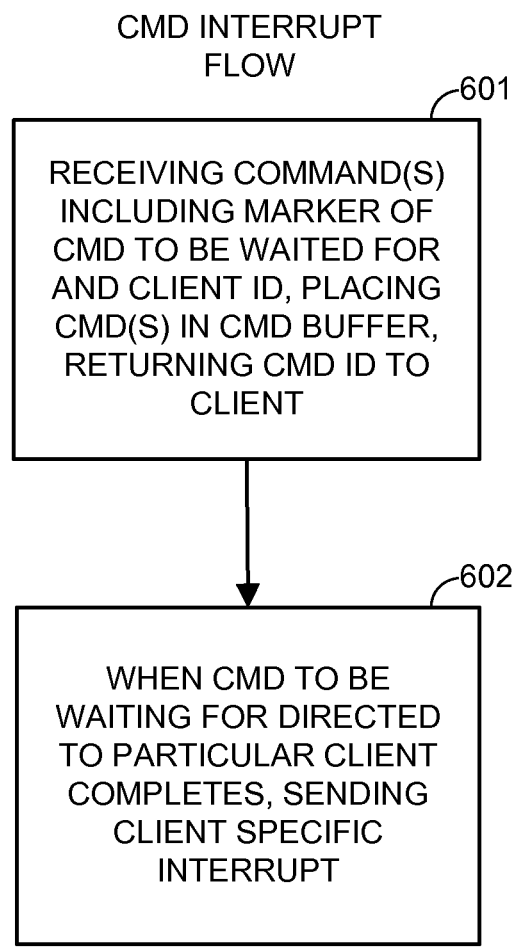
FIG. 6A is a flow chart illustrating one example of a method for communications regarding inter-device/module command execution from the perspective of an operating device consistent with this disclosure.

FIG. 6A is a flow chart diagram depicting one example a method for inter-device/module command execution consistent with the disclosure described herein. The method of FIG. 6A may be implemented according to a computing system such as computing system 2 depicted in FIGS. 1 and 2, however other computing systems are also contemplated. The example of FIG. 6A is from the perspective of an operating device e.g. operating device 22 as discussed herein. As depicted, an operating device receives, from one or more clients, at least one command indication of one or more commands to be executed on the operating device (601). If a client is awaiting completion of execution of the command, the command indication may include a command completion identifier that indicates that the client is awaiting completion of execution of the command.

In one example, the command completion identifier is one or more bits of the command indication. The one or more bits may be set to indicate whether or not a particular command is a command for which the client is awaiting execution. The operating device may be adapted to read the one or more bits and determine whether the client is awaiting completion of execution of the command. In addition, the command indication includes a client identifier that identifies the client that the command indication was received from.

Based on comparison on the command completion identifier with completed commands, when execution completes for the command for which the operating device received a command completion indicator with the command indication, a client-specific interrupt is generated by the operating device and communicated to the client identified by the client identification (602). The client-specific interrupt may or may not include a command identifier for the command that triggered the generic interrupt.

Figure 6B:
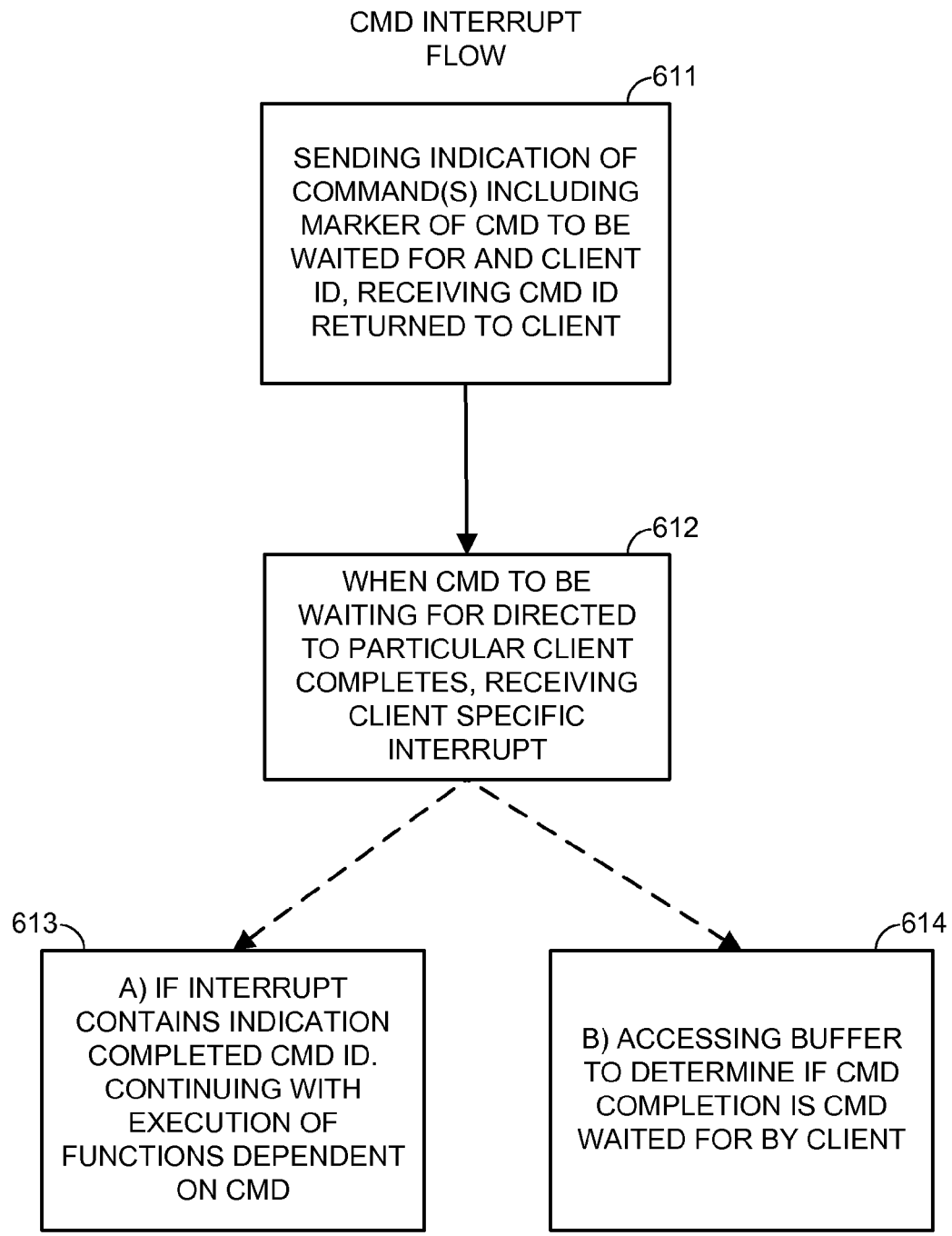
FIG. 6B is a flow chart illustrating one example of a method for communications regarding inter-device/module command execution from the perspective of a client consistent with this disclosure.

FIG. 6B is a flow chart diagram depicting one example a method for inter-device/module command execution consistent with the disclosure described herein. The method of FIG. 6B may be implemented according to a computing system such as computing system 2 depicted in FIGS. 1 and 2, however other computing systems are also contemplated. The example depicted in FIG. 6B is from the perspective of a client, e.g. client 4 as depicted in FIGS. 1 and 2. As depicted, a client sends at least one command indication of one or more commands to be executed on an operating device (611). The command indication includes at least one command completion indicator that indicates that the client is awaiting completion of execution of the one or more commands. In one example, the command completion identifier is one or more bits of the command indication. The one or more bits may be set to indicate whether or not a particular command is a command for which the client is awaiting execution. The command indication further includes at least one client identifier that identifies the client sending the command indication.

The client receives from the operating device at least one interrupt indicating that the command for which the client sent a command indication has completed execution (612). The at least one interrupt may or may not include a command identifier that identifies the completed command that triggered the interrupt.

If the at least one interrupt includes a command identifier, the client may review the interrupt to determine an identity of the command indicator sent by the client that triggered the interrupt (613). The client may retrieve the results of execution of the command and continue execution of functions dependant on completion of execution.

If the at least one interrupt does not include a command identifier, the client may access a buffer in which completed commands are stored to determine an identity of the command that triggered the interrupt received by the client (614). The client may retrieve the results of execution of the command and continue execution of functions dependant on completion of execution of the command.

FIGS. 7-10 depict generally one example of a specific implementation of systems, methods, and devices to improve communication regarding inter-device/module command execution consistent with the disclosure described herein. The examples depicted in FIGS. 8-11 are provided for exemplary purposes only. One of skill in the art will recognize that the various examples of interrupt based inter-device/module command execution discussed herein are not limited to the examples described in FIGS. 7-10.

Figure 7:
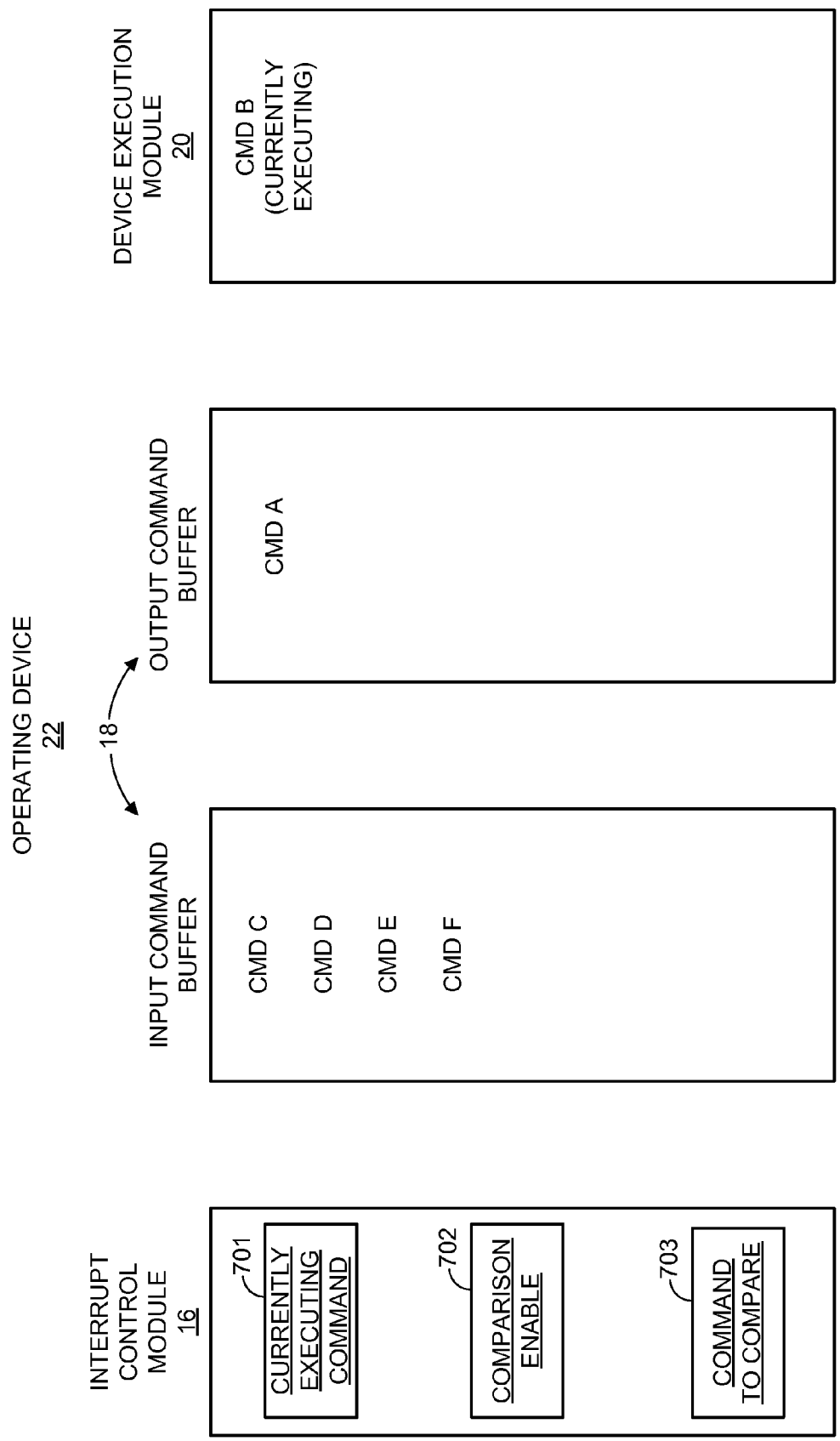
FIG. 7 is a block diagram illustrating one example of components of operating device 22 utilized by the processes described with respect to FIGS. 8-10.
Figure 8:
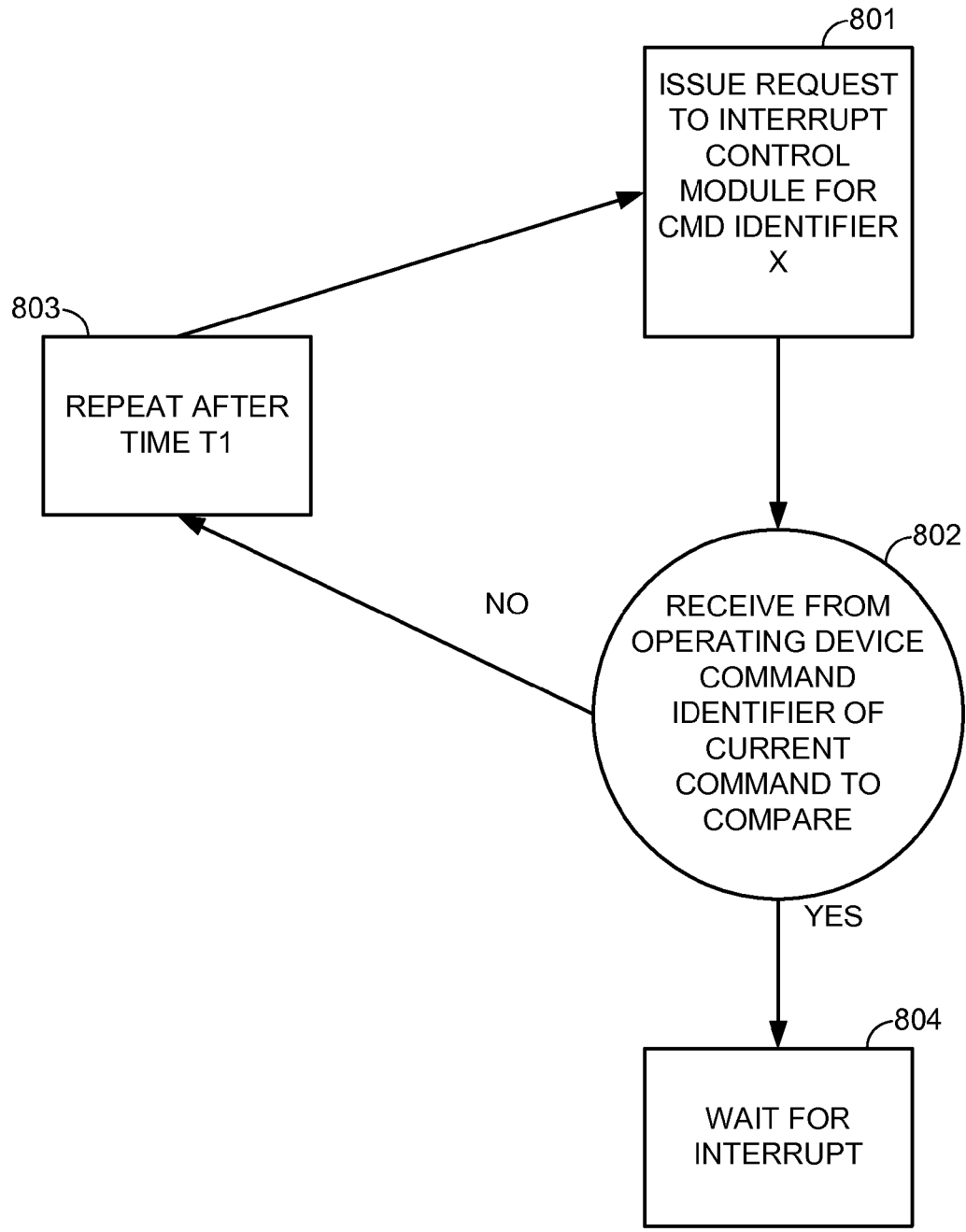
FIG. 8 is a flow chart illustrating one example of a process adapted to run on a client device to facilitate communications regarding inter-device/module command execution consistent with this disclosure.
Figure 9:
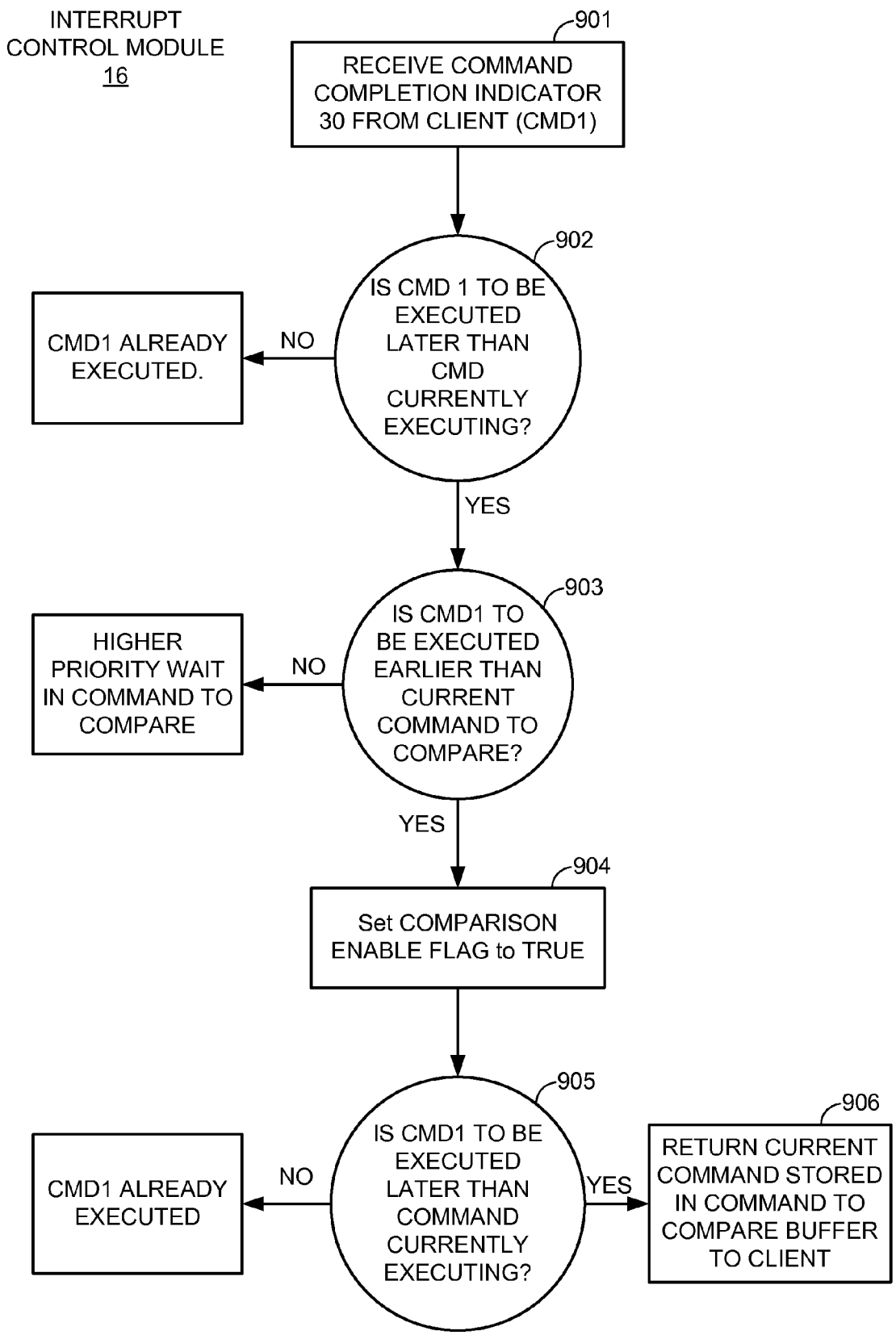
FIG. 9 is a flow chart illustrating one example of a process adapted to run on an operating device to facilitate communications regarding inter-device/module command execution consistent with this disclosure.
Figure 10:
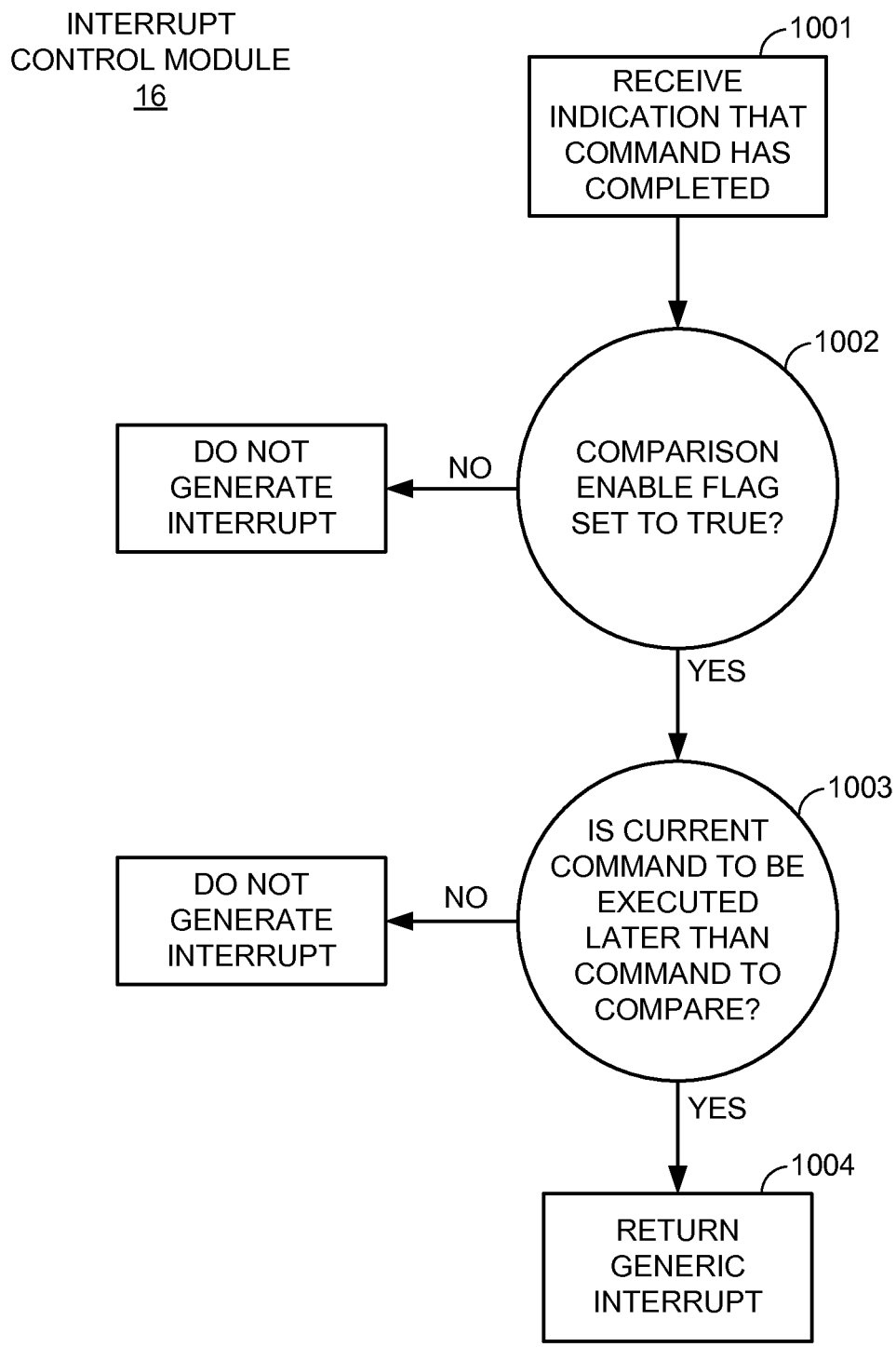
FIG. 10 is a flow chart illustrating one example of an interrupt generation process adapted to run on an operating device to facilitate communications regarding inter-device/module command execution consistent with this disclosure.

FIG. 7 depicts generally one example of components of operating device 22 utilized by the methods described with respect to FIGS. 8-10. As previously discussed, operating device 22 may include command buffer 18. Command buffer 18 may include an input command buffer that stores command identifiers 60 of commands that are to be executed on device execution module 20 of operating device 22. Command buffer 18 further include an output command buffer that stores command identifiers 60 of commands that have completed execution on device execution module 20 of operating device 22.

As depicted, interrupt control module 16 includes a series of buffers, registers, memory blocks, or the like that are used for comparison of values used to facilitate generation of interrupts 40. For example, interrupt control module 16 may include a buffer 701 configured to store a command identifier 60 of a command that is currently executing on device execution module 20. Interrupt control module 16 further include a comparison enable buffer 702 configured to store an enable flag that enables comparison of one or more command identifiers 60 to one or more command completion indicators 30. In one example, the enable flag is set to false each time an interrupt is generated by interrupt control module 16. Interrupt control module 16 may further include a command to compare buffer 703 configured to store one or more command completion indicators 30 for which to compare (e.g. commands for which a command completion indicator 30 has been received).

FIG. 8 illustrates a flow chart diagram of a process that may be executed by command completion module 12*a* of a client to communicate a command completion indicator 30 to an operating device 22. The client may initiate the process by transmitting a command completion indicator 30 to interrupt control module 16 (801). As discussed above, the command completion indicator 30 may be the command identifier 60 of a command which the client had previously transmitted to operating device 22 for execution. The command identifier 60 may be a binary number that is incremented each time a command is received by command receipt module 24. Thus, the command identifier 60 is not only a unique number assigned to each command, it also represents an order of execution of commands in the input command buffer of command buffer 18.

As will be discussed in greater detail below, if certain conditions are met, command completion control module 12 may receive from interrupt control module 16 an indication of a command for which a command completion indicator 30 was sent (802). The indication of a command may be the actual command itself, a command identifier 60, or an address of a memory location where the command may be accessed. Command completion module 12*a* may then perform a comparison of the returned value to the command completion indicator 30 for which the client desires an interrupt 40 indicating completion of execution. If the indication of a command matches the command indicated by the sent command completion indicator 30, then command completion module 12*a* knows that the command associated with the command completion indicator 30 it sent is next in line for comparison, and that command completion module 12*a* may expect to receive an interrupt 40. Thus, the client may wait for receipt of an interrupt 40 (804).

If, however, no indication of a command is returned to, then command completion module 12*a* knows that at least one other command must be compared before the command completion indicator 30 it sent. Accordingly, command completion module 12*a* may wait some period of time before again sending another command completion indicator 30 to interrupt control module 16 (803).

FIG. 9 is a flow chart illustrating a process that may run on interrupt control module 16. Interrupt control module 16 may receive a command completion indicator 30 from a client (901). As discussed above, the command completion indicator 30 may be a command identifier 60 that identifies the command for which client 4 is awaiting completion of execution.

Interrupt control module 16 may compare the received command completion indicator 30 to a command identifier 60 of a command stored in currently executing command buffer 701 (902). This comparison serves to ensure that the command associated with the command completion indicator 30 sent by the client has not already completed execution, and therefore an interrupt 40 is not necessary. In one example, interrupt control module 16 may not return any value to a client that sent command completion indicator 30. The client may then determine via other means that a command for which command completion indicator 30 was sent has already completed, e.g. a timeout. In other examples, interrupt control module 16 may send at least one indication that a command identified by command completion indicator 30 has already completed execution.

If the received command completion indicator 30 is to be executed after the command stored in currently executing command buffer 701, then the command identifier 60 associated with command completion indicator 30 is stored in command to compare buffer 703. Also, if it is determined at 902 that the command associated with command completion indicator 30 is to be executed after the command identifier 60 stored in currently executing command buffer 701, the comparison enable flag stored in comparison enable buffer 702 is set to true to enable future comparisons. Interrupt control module 16 may compare the command completion indicator 30 to a command identifier 60 currently stored in command to compare buffer 703 (903). If the command associated with the received command completion indicator 30 is to be executed earlier than the command associated with a command identifier 60 currently stored in command to compare buffer 703, then the command associated with command completion indicator 30 should be given priority before the existing command stored in command to compare buffer 703. According to one example, interrupt control module 16 may write a command identifier 60 associated with the received command completion indicator 30 to the command to compare buffer 703. Interrupt control module 16 may also set the comparison enable flag of comparison enable buffer 802 to true to enable future comparisons (904).

If the command associated with the received command completion indicator 30 is to be executed after the command associated with the command identifier 60 currently stored in command to compare buffer 703, then a higher priority command must complete execution before the command associated with the received command completion indicator 30. Accordingly, in one example nothing is returned to the client. In another example, one or more indications that a higher priority wait is scheduled are sent to the client.

Command completion indicator 30 may again be compared to the command identifier 60 stored in currently executing command buffer 701 to ensure that the command associated with command completion indicator 30 has not completed execution while interrupt control module 16 is processing other steps (905). If command completion indicator 30 is to be executed later than the command identifier 60 stored in currently executing command buffer 701, then an indication of a command currently stored in command to compare buffer 703 is returned to command completion module 12a (905). In one example not depicted, interrupt control module 16 may wait for generation of an interrupt 40 before returning an indication of a command currently stored in command to compare buffer 703.

FIG. 10 is a flow chart diagram illustrating a process that may run on interrupt control module 16 to generate an interrupt 40. As commands complete execution, interrupt control module 16 may receive an indication of completed commands, such as command identifier 60 (1001). Interrupt control module 16 may check comparison enable buffer 802 to determine whether comparison has been enabled by the process described with respect to FIG. 9 (1002). If it has not been enabled, no comparison is made, and no interrupt 40 is generated. If it has been enabled, interrupt control module 16 may compare a command identifier 60 stored in currently executing command buffer 801 to a command identifier 60 in command to compare buffer 703 (1003). If the command identifier 60 stored in command to compare buffer 703 is to be executed after the identifier stored in currently executing command buffer 701, then an interrupt 40 may be generated (1004). The interrupt 40 may be sent to one or more clients. As discussed above clients may review the interrupt 40 and/or an output buffer of command buffer 18 to determine whether the interrupt 40 was directed to the client. A client may then retrieve data or information resulting from the process, and continue execution of commands or processes which were dependent on the command for which interrupt 40 was generated.

The techniques and/or components (e.g., client 4, operating device 22, command processor module 14, command completion modules 12a-e, command buffer 18, command receipt module 24, interrupt control module 16, device execution module 20 as depicted in FIGS. 1 and 2) described in this disclosure may be implemented by any combination of one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor", "controller", "device", or "module" as used herein, may refer to any one or more of the foregoing structures or any other structure suitable for implementation of the techniques described herein.

The various components illustrated herein (e.g., clients 4a-4e, operating device 22, command processor module 14, command completion modules 12a-e, command buffer 18, command receipt module 24, interrupt control module 16, device execution module 20 as depicted in FIGS. 1 and 2) may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Accordingly, the representation of features as components, units, or modules is intended to highlight particular functional features for ease of illustration, and does not necessarily require realization of such features by separate hardware, firmware, or software components. In some cases, various units may be implemented as programmable processes performed by one or more processors.

Any features described herein (e.g., features related to clients 4a-4e, operating device 22, command processor module 14, command completion modules 12a-e, command buffer 18, command receipt module 24, interrupt control module 16, device execution module 20 as depicted in FIGS. 1 and 2) as modules, devices, or components may be implemented together in an integrated logic device or separately as discrete but interoperable logic devices. In various aspects, such components (e.g., clients 4a-4e, operating device 22, command processor module 14, command completion modules 12a-e, command buffer 18, command receipt module 24, interrupt control module 16, device execution module 20 as depicted in FIGS. 1 and 2) may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any variety of applications and devices.

The techniques and/or components (e.g., clients 4a-4e, operating device 22, command processor module 14, command completion modules 12a-e, command buffer 18, command receipt module 24, interrupt control module 16, device execution module 20 as depicted in FIGS. 1 and 2) described herein may be implemented in hardware, software, firmware, or any combination thereof. If implemented in software, the techniques may be realized in part by a computer-readable medium comprising program code containing instructions encoded on the computer-readable medium that, when executed, cause a processor to perform one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

Various aspects have been described in this disclosure. These and other aspects are within the scope of the following claims.

The invention claimed is:
1. A method, comprising:
 receiving, from one or more clients by a processor, one or more commands to be executed by the processor;
 receiving, from the one or more clients by the processor, a command completion indicator that indicates at least one command for which the one or more clients are awaiting completion of execution by the processor, wherein the command completion indicator includes a comparison flag;
 determining whether the comparison flag indicates that comparison is enabled;
 if the comparison flag indicates that comparison is enabled:

comparing, by the processor, the command completion indicator to the one or more commands to determine whether an interrupt should be generated for the at least one command;

generating, by the processor, an interrupt that indicates completion of execution of the at least one command for which the command completion indicator was received, wherein the interrupt is generated based on the comparison;

receiving, by the processor, a request for data from a buffer responsive to generating the interrupt; and transmitting, by the processor, data indicative of the at least one completed command from a buffer to the one or more clients.

2. The method of claim 1, wherein generating the interrupt includes generating a generic interrupt.

3. The method of claim 1, wherein receiving the one or more commands to be executed by the processor includes receiving the one or more commands from at least one of a plurality of clients, and wherein generating the generic interrupt includes transmitting to each of the plurality of clients an indication that the at least one command for which the at least one command completion indicator was received has completed execution.

4. The method of claim 1, wherein generating the interrupt includes providing at least one command identifier that identifies the at least one command for which completion of execution caused the interrupt to be generated.

5. The method of claim 1, wherein generating the interrupt further includes storing at least one command identifier that identifies the at least one command for which completion of execution caused the interrupt to be generated in a buffer for acquisition by at least one of the one or more clients.

6. The method of claim 1, wherein receiving, from the one or more clients, the one or more command indications further includes receiving the at least one command completion indicator that indicates the at least one command for which the one or more clients are awaiting completion of execution.

7. The method of claim 1, wherein generating the interrupt includes generating a client-specific interrupt.

8. The method of claim 1, further comprising:

receiving, from the one or more clients, at least one client identifier that identifies at least one client of the one or more clients from which the at least one command completion indicator was received.

9. The method of claim 8, wherein generating the interrupt includes generating a client-specific interrupt, and wherein the client-specific interrupt is based at least in part on the at least one client identifier.

10. The method of claim 1, wherein receiving the one or more command indications of commands to be executed by the processor includes receiving the at least one command completion indicator and at least one client identifier that identifies at least one client of the one or more clients from which the at least one command completion indicator was received, and wherein generating the interrupt includes generating a client-specific interrupt based at least in part on the at least one client identifier.

11. A device, comprising:

a hardware-based processor configured to execute commands stored in a non-transitory computer readable medium;

a command receipt module configured to receive from one or more hardware-based clients one or more commands to be executed by the hardware-based processor;

an interrupt control module configured to receive from the one or more hardware-based clients a command completion indicator that indicates at least one command for which the one or more clients are awaiting completion of execution by the hardware-based processor, wherein the command completion indicator includes a comparison flag;

determine whether the comparison flag indicates that comparison is enabled;

if the comparison flag indicates that comparison is enabled:

compare the command completion indicator to the one or more commands to determine whether an interrupt should be generated for the at least one command;

wherein the interrupt control module is configured to, upon completion of execution, by the hardware-based processor, of the at least one command for which the command completion indicator was received, generate an interrupt that indicates that the command for which a command completion indicator was received has completed execution, wherein the interrupt is generated based on the comparison;

receive a request for data from a buffer responsive to generating the interrupt; and transmit data indicative the at least one completed command from a buffer to the one or more clients.

12. The device of claim 11, wherein the interrupt control module is configured to generate an interrupt that is a generic interrupt.

13. The device of claim 11, wherein the command receipt module is configured to receive the one or more command indications of commands from at least one of a plurality of clients, and wherein the interrupt control module is configured to generate an interrupt and transmit the interrupt to each of the plurality of clients.

14. The device of claim 11, wherein the interrupt control module is configured to generate the interrupt, wherein the interrupt includes at least one command identifier that identifies the at least one command for which completion of execution caused the interrupt to be generated.

15. The device of claim 11, wherein the interrupt control module is configured to generate the interrupt and store at least one command identifier that identifies the at least one command for which completion of execution caused the interrupt to be generated in a buffer for acquisition by the at least one of the one or more clients.

16. The device of claim 11, wherein the command receipt module is configured to receive from the one or more clients the one or more command indications that further include the at least one command completion indicator.

17. The device of claim 11, wherein the interrupt control module is configured to generate an interrupt that is a client-specific interrupt.

18. The device of claim 11, wherein the interrupt control module is further configured to receive at least one client identifier that identifies at least one client of the one or more clients from which the at least one command completion indicator was received.

19. The device of claim 18, wherein the interrupt control module is configured to generate the interrupt, wherein the interrupt is a client-specific interrupt, and wherein the client-specific interrupt is based at least in part on the at least one client identifier.

20. The device of claim 11, wherein the command receipt module is configured to receive from one or more clients a command indication that further includes at least one command completion indicator and at least one client identifier that indicates an identity of a client from which the command indication was received.

21. A non-transitory computer readable storage medium comprising instructions for causing a programmable processor to:
 receive, from one or more clients, one or more command indications of commands to be executed by the programmable processor;
 receive, from the one or more clients, a command completion indicator that indicates at least one command for which at least one of the one or more clients is awaiting completion of execution by the programmable processor,
 wherein the command completion indicator includes a comparison flag;
 determine whether the comparison flag indicates that comparison is enabled;
 if the comparison flag indicates that comparison is enabled:
  compare, by the programmable processor, the command completion indicator to the one or more commands to determine whether an interrupt should be generated for the at least one command;
  generate, by the programmable processor, an interrupt that indicates completion of execution of the at least one command for which the command completion indicator was received, wherein the interrupt is generated based on the comparison;
  receiving, by the programmable processor, a request for data from a buffer responsive to generating the interrupt; and
  transmit, by the programmable processor, data indicative of the at least one completed command from a buffer to the one or more clients.

22. The non-transitory computer readable storage medium of claim 21, wherein the interrupt is a generic interrupt.

23. The non-transitory computer readable storage medium of claim 21, wherein the one or more command indications are received from a plurality of clients, wherein the interrupt indicates that at least one command for which a command completion indicator was received from at least one of the one or more clients has completed execution, and wherein the instructions cause the programmable processor to transmit the interrupt to each of the plurality of clients.

24. The non-transitory computer readable storage medium of claim 21, wherein the interrupt includes at least one command identifier that identifies at least one command for which completion of execution caused the interrupt to be generated.

25. The non-transitory computer readable storage medium of claim 21, further comprising instructions to cause the programmable processor to: upon generating the interrupt, place in a buffer at least one command identifier that identifies at least one command for which completion of execution of the at least one command caused the interrupt to be generated.

26. The non-transitory computer readable storage medium of claim 21, wherein the one or more command indications received from the one or more clients further include the at least one command completion indicator.

27. The non-transitory computer readable storage medium of claim 21, wherein the interrupt is a client-specific interrupt.

28. The non-transitory computer readable storage medium of claim 21, further comprising instructions to cause the programmable processor to:
 receive, from the one or more clients, at least one client identifier that identifies a client from which a command completion indicator was received.

29. The non-transitory computer readable storage medium of claim 21, wherein the interrupt is a client-specific interrupt, and wherein the client-specific interrupt is based at least in part on the at least one client identifier.

30. The non-transitory computer readable storage medium of claim 21, wherein the one or more command indications further include the at least one command completion indicator, and wherein the one or more command indications further include at least one client identifier that identifies a client from which the one or more command indications was received; and wherein the interrupt is a client-specific interrupt based at least in part on the at least one client identifier.

31. A device, comprising:
 means for receiving, from one or more clients, one or more command indications of commands stored in a non-transitory computer readable medium to be executed by a processor;
 means for receiving, from the one or more clients, a command completion indicator of at least one of the one or more commands for which the one or more clients are awaiting completion of execution by the processor,
 wherein the command completion indicator includes a comparison flag;
 means for determining whether the comparison flag indicates that comparison is enabled;
 means for comparing the command completion indicator to the one or more commands to determine whether an interrupt should be generated for the at least one command if the comparison flag indicates that comparison is enabled;
 means for generating, by the processor, an interrupt that indicates completion of execution of at least one command for which the command completion indicator was received if the comparison flag indicates that comparison is enabled, wherein the interrupt is generated based on the comparison;
 means for receiving, by the processor, a request for data from a buffer responsive to generating the interrupt if the comparison flag indicates that comparison is enabled; and
 means for transmitting, by the processor, data indicative of the at least one completed command from a buffer to the one or more clients if the comparison flag indicates that comparison is enabled.

32. The device of claim 31, wherein the means for generating an interrupt comprises means for generating a generic interrupt.

33. The device of claim 31, wherein the means for receiving one or more command indications comprises means for receiving the one or more command indications from a plurality of clients, wherein the means for generating an interrupt comprises means for transmitting to each of the plurality of clients the interrupt, wherein the interrupt indicates that at least one command for which a command completion indicator was received has completed execution.

34. The device of claim 31, wherein the means for generating the interrupt comprises means for generating an interrupt that includes at least one command identifier that identifies a command for which completion of execution caused the interrupt to be generated.

35. The device of claim 31, wherein the means for generating the interrupt, upon generation of the interrupt, comprises means for placing in a buffer at least one indication of a command for which completion of execution caused the interrupt to be generated.

36. The device of claim 31, wherein the one or more command indications include the at least one command completion indicator.

37. The device of claim 31, wherein the means for generating an interrupt comprises means for generating a client-specific interrupt.

38. The device of claim 31, further comprising:
means for receiving, from the one or more clients, at least one client identifier that identifies a command for which at least one command completion indicator was received.

39. The device of claim 38, wherein the means for generating an interrupt comprise means for generating a client-specific interrupt, and wherein the client-specific interrupt is based at least in part on the at least one client identifier.

40. The device of claim 31, wherein the one or more command indications further include the at least one command completion indicator and at least one client identifier that identifies a client from which the one or more command indications was received.

41. The method of claim 1, wherein the processor comprises at least one of a central processing unit (CPU) and a graphics processing unit (GPU).

42. The device of claim 11, wherein the processor comprises at least one of a central processing unit (CPU) and a graphics processing unit (GPU).

43. The computer readable storage medium of claim 21, wherein the programmable processor comprises at least one of a central processing unit (CPU) and a graphics processing unit (GPU).

44. The device of claim 31, wherein the processor comprises at least one of a central processing unit (CPU) and a graphics processing unit (GPU).

45. The method of claim 1, wherein the command completion indicator includes an identifier that identifies a particular command.

46. The device of claim 11, wherein the command completion indicator includes an identifier that identifies a particular command.

47. The non-transitory computer readable storage medium of claim 21, wherein the command completion indicator includes an identifier that identifies a particular command.

48. The device of claim 31, wherein the command completion indicator includes an identifier that identifies a particular command.

* * * * *